(12) United States Patent
Olinger et al.

(10) Patent No.: US 10,093,063 B2
(45) Date of Patent: Oct. 9, 2018

(54) CLAMPING RING

(75) Inventors: Kathryn Marie Olinger, Rosemount, MN (US); Tim Cota, Lakeville, MN (US)

(73) Assignee: Uponor, Inc., Appley Valley, MN (US)

( * ) Notice: Subject to any disclaimer, the term of this patent is extended or adjusted under 35 U.S.C. 154(b) by 638 days.

(21) Appl. No.: 13/409,529

(22) Filed: Mar. 1, 2012

(65) Prior Publication Data

US 2012/0153614 A1 Jun. 21, 2012

Related U.S. Application Data

(63) Continuation of application No. 11/956,568, filed on Dec. 14, 2007, now Pat. No. 8,146,225.

(51) Int. Cl.
*B29C 65/00* (2006.01)
*B29C 47/00* (2006.01)
(Continued)

(52) U.S. Cl.
CPC ...... *B29C 66/1142* (2013.01); *B29C 47/0066* (2013.01); *B29C 66/124* (2013.01); *B29C 66/522* (2013.01); *B29C 66/54* (2013.01); *B29C 66/742* (2013.01); *B29D 23/003* (2013.01); *B29C 47/0023* (2013.01); *B29C 47/0026* (2013.01); *B29C 47/0038* (2013.01); *B29C 57/02* (2013.01); *B29C 65/58* (2013.01); *B29C 65/64* (2013.01); *B29C 66/1122* (2013.01); *B29C 66/71* (2013.01); *B29C 2793/0027* (2013.01); *B29K 2023/0691* (2013.01); *B29L 2031/24* (2013.01); *Y10T 29/49789* (2015.01);
(Continued)

(58) Field of Classification Search
USPC ...... 285/258, 381.4, 242, 256, 382.2, 382.4; 29/507, 523
See application file for complete search history.

(56) References Cited

U.S. PATENT DOCUMENTS 2,733,941 A * 2/1956 Trevaskis .................. 285/222.1
3,752,593 A    8/1973 Fitzgerald et al.
(Continued)

FOREIGN PATENT DOCUMENTS

EP    0530387 B2   10/1999
EP    1240981       9/2002
(Continued)

OTHER PUBLICATIONS

F1960 Standard Specification for Cold Expansion Fittings with PEX Reinforcing Rings for Use with PEX Tubing, pp. 1-7, published Jul. 1999 by the American Society for Testing and Materials 100 Barr Harbor Dr, W Conshohocken, PA.
(Continued)

*Primary Examiner* — James M Hewitt, II
(74) *Attorney, Agent, or Firm* — Occhiuti & Rohlicek LLP

(57) ABSTRACT

In a general aspect, a clamping ring for use on a pipe when making a pipe connection is configured such that when establishing the pipe connection an end of a pipe and the surrounding clamping ring are expanded simultaneously, wherein the clamping ring is made of a plastic material having memory properties such that after expanding, the clamping ring shrinks or contracts automatically, the clamping ring further comprising a chamfer on the inlet inner diameter edge of the clamping ring.

14 Claims, 1 Drawing Sheet

(51) Int. Cl.
*B29D 23/00* (2006.01)
*B29C 57/02* (2006.01)
*B29C 65/58* (2006.01)
*B29C 65/64* (2006.01)
*B29K 23/00* (2006.01)
*B29L 31/24* (2006.01)

(52) U.S. Cl.
CPC .... *Y10T 29/49798* (2015.01); *Y10T 29/49995* (2015.01)

(56) References Cited

U.S. PATENT DOCUMENTS

| | | | |
|---|---|---|---|
| 3,951,438 A * | 4/1976 | Scales | 285/55 |
| 4,159,161 A | 6/1979 | Timmer | |
| 4,304,616 A | 12/1981 | Richardson | |
| 4,305,608 A * | 12/1981 | Stuemky et al. | 285/256 |
| 4,321,911 A | 3/1982 | Offutt | |
| 4,325,571 A * | 4/1982 | Funderburg et al. | 285/148.23 |
| 4,486,129 A | 12/1984 | Vowel | |
| 4,693,643 A | 9/1987 | Heyworth | |
| 4,717,179 A | 1/1988 | Haberstock et al. | |
| 5,228,721 A * | 7/1993 | Whittle et al. | 285/23 |
| 5,568,948 A * | 10/1996 | Bartholomew | 285/242 |
| 5,735,554 A | 4/1998 | Imgam | |
| 6,367,850 B1 * | 4/2002 | Thrift et al. | 285/382 |
| 6,386,594 B1 * | 5/2002 | Schuttler et al. | 285/251 |
| 6,663,119 B2 | 12/2003 | White | |
| 6,773,039 B2 * | 8/2004 | Muenster et al. | 285/259 |
| 2004/0195831 A1 * | 10/2004 | Ohya | 285/242 |
| 2009/0152864 A1 | 6/2009 | Olinger et al. | |

FOREIGN PATENT DOCUMENTS

| | | |
|---|---|---|
| GB | 2197408 A | 5/1988 |
| WO | 2007/006863 | 1/2007 |

OTHER PUBLICATIONS

F2080 Standard Specification for Cold-Expansion Fittings with Metal Compression-Sleeves for PEX Pipe, pp. 1-7, published May 2005, by the American Society for Testing and Materials, 100 Barr Harbor Drive, West Conshohocken, PA.

Supplemental European Search Report dated Feb. 19, 2015, for Application No. 008862377.2.

* cited by examiner

CLAMPING RING

RELATED APPLICATIONS

This application is a continuation of U.S. application Ser. No. 11/956,568, "METHOD OF FORMING A CLAMPING RING AND A CLAMPING RING," filed Dec. 14, 2007, and published as US-2009-0152864 on Jun. 18, 2009, now U.S. Pat. No. 8,146,225.

BACKGROUND OF THE INVENTION

The invention relates to a method of forming a clamping ring to be used on a pipe when making a pipe connection.

Further, the invention relates to a clamping ring to be used on a pipe when making a pipe connection.

It is known to provide a pipe connection between one end of a pipe made of a plastic material with memory properties and a connecting piece. The memory properties mean that plastic pipes with a memory capacity automatically strive to return essentially to their original shape and form after having been expanded. For example plastic pipes that are manufactured from cross-linked polyethylene possess an active memory capacity at temperatures as low as room temperature. Pipes of this nature are joined together by widening one end of the pipe and inserting into the widened pipe-end a flanged connector which forms a part of the pipe connecting piece, normally made of metal, and which is retained in said pipe-end until the pipe has shrunk to an extent at which it is able to firmly hold the connecting piece. A clamping ring made of elastic material, which may be the same plastic material as that from which the pipe is made, is expanded and shrunk over the pipe end in order to further enhance the holding and sealing pressure at the pipe connection region. The clamping ring is expanded at the same time as the pipe-end is expanded, with the clamping ring in position around said pipe-end. Such a solution has been disclosed for example in EP 0,530,387. In EP 0,530,387 the clamping ring has been made from an extruded pipe by cutting the pipe into a short enough part to form a clamping ring. In WO 2007/006,863 the clamping ring is made by injection molding.

BRIEF DESCRIPTION OF THE INVENTION

The object of the invention is to provide a new method of forming a clamping ring and a new clamping ring.

The method of the invention is characterized by: extruding a pipe from a plastic material having memory properties, whereby while extruding the pipe its inner diameter is formed smaller than the outer diameter of the pipe onto which the clamping ring is positioned before making the pipe connection, cutting the extruded pipe to form a pipe part, making the inner diameter of the pipe part larger by removing material from the inside of the pipe part but only over part of the length of the pipe part such that a stop edge is formed at one end of the pipe part, whereby the pipe part forms the clamping ring.

Further, the clamping ring of the invention is characterized in that the clamping ring is formed from an extruded pipe by cutting the pipe into a short enough pipe part, which pipe is extruded of a plastic material having memory properties and has an inner diameter smaller than the outer diameter of the pipe onto which the clamping ring is positioned before making the pipe connection, and which pipe part has been made larger by removing material from the inside of the pipe part but only over part of the length of the pipe part such that the clamping ring comprises a stop edge at one end of the pipe part.

In the invention a pipe is extruded. The extruded pipe is cut to form a pipe part. While extruding the pipe, its inner diameter is formed smaller than the outer diameter of a pipe onto which the clamping ring is positioned before making a pipe connection. The inner diameter of the pipe part is made larger by removing material from the inside of the pipe part but only over part of the length of the pipe part such that a stop edge is formed. The clamping ring is used on a pipe when making a pipe connection. The clamping ring is fast, simple and easy to manufacture.

In one embodiment the clamping ring is provided with a chamfer on the inlet of the clamping ring. Preferably the chamfer is formed in the same manufacturing step as the partial widening of the inner diameter. The chamfer helps in positioning the clamping ring on the end of the pipe in the pipe connection.

Although the clamping ring is simple, it is provided with a stop edge. The stop edge ensures that the clamping ring remains correctly positioned on the pipe end when a pipe connection is being made and after the pipe connection has been made.

BRIEF DESCRIPTION OF THE FIGURES

In the following, the invention will be described in greater detail by means of preferred embodiments with reference to accompanying drawings, in which FIG. 1 schematically shows a pipe connection in cross-section, FIG. 2 schematically shows a cross-sectional side view of a clamping ring.

DETAILED DESCRIPTION OF THE INVENTION

Figure 1:
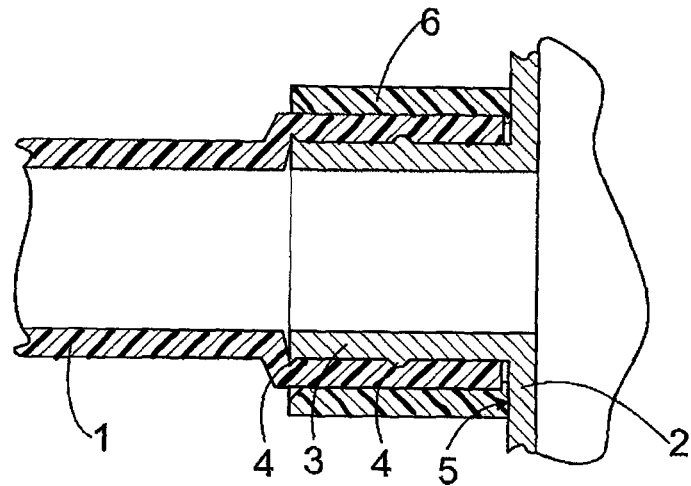

FIG. 1 shows a pipe 1, which is comprised of a plastic material having memory properties, for instance a cross-linked polyethylene PEX or any other cross-linked polyolefin, and a connecting piece 2 made of metal. The connecting piece 2 comprises a nipple end 3. The nipple end 3 comprises radially projecting flanges 4. The nipple end 3 is terminated with a radial abutment surface 5.

The nipple end 3 has an outer diameter which exceeds the inner diameter of the unexpanded pipe 1. An elastic clamping ring 6 is mounted on an end of the pipe 1. In its relaxed state, the clamping ring 6 has an inner diameter which corresponds to the outer diameter of the unexpanded pipe 1.

When establishing the pipe connection shown in FIG. 1, the end of pipe 1 and the surrounding clamping ring 6 are expanded simultaneously by an expander tool. The nipple end 3 is then immediately inserted into the end of the pipe until the abutment surface 5 is in abutment with the end of the pipe 1 and with the clamping ring 6. The end of the pipe 1 and the clamping ring 6 then shrink or contract automatically, so as to obtain a sealing contact between the inner surface of the pipe and the flange in particular. A sealing contact is also obtained between the inner surface of the pipe 1 and the outer surface of the nipple end 3.

Figure 2:
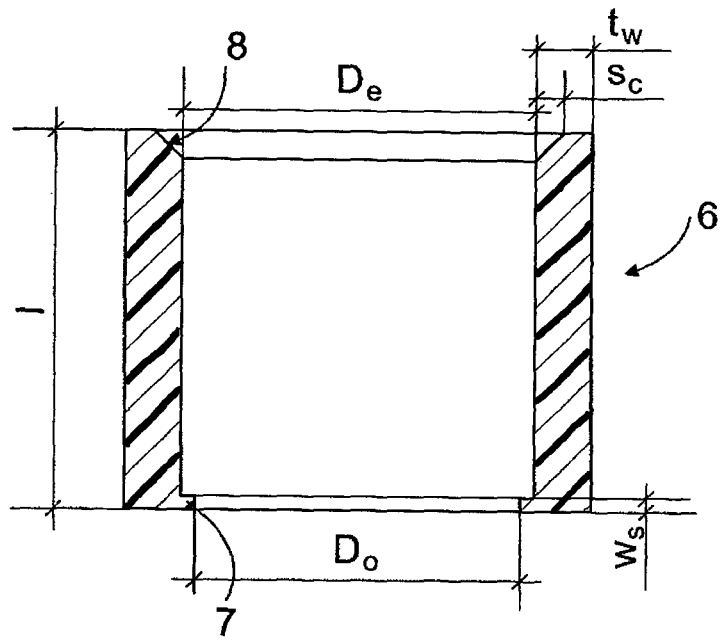

FIG. 2 shows a cross-section of a clamping ring. The outer diameter of the clamping ring may vary between 12-150 mm, for example. The length l of the clamping ring 6 may be e.g. substantially equal to the diameter of the clamping ring. An average wall thickness $t_w$ of the clamping ring may vary between 2-15 mm, for instance.

The clamping ring 6 is made of cross-linked polyolefin. The clamping ring may be made of cross-linked polyethylene PEX or cross-linked polypropylene, for example.

One end of the clamping ring 6 is provided with an inward extending stop edge 7. The stop edge 7 is a radially inward protruding continuous ring. The stop edge 7 ensures that the end of the pipe 1 is in a correct position with respect to the clamping ring 6.

Figure 3:
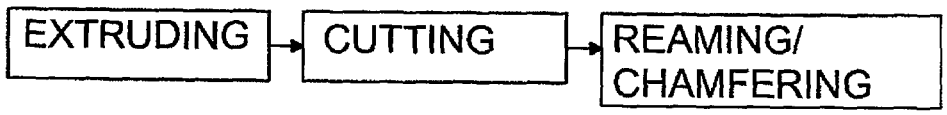
FIG. 3 is a schematic representing the steps of making a clamping ring.

The manufacturing of the clamping ring is illustrated in FIG. 3. First, a pipe is extruded. The extruded pipe has an inner diameter that is smaller than the outer diameter of the pipe 1 onto which the clamping ring 6 is positioned before making the pipe connection. After extruding the extruded pipe is cut into a short enough pipe part. The inner diameter of the pipe part is made larger by removing material from the inside of the pipe part. Preferably, the material is removed by machining the inner surface of the pipe part. Preferably the machining is performed by a reaming drill. A chamfer is also formed on the inlet of the clamping ring 6. The chamfering and the reaming can be made in the same manufacturing step of the clamping ring 6.

The inner diameter of the pipe is made larger only over part of the length l of the pipe part. The inner diameter of the pipe part can be made larger for example in a machining operation that creates a counter bore that bores approximately 95% through the length l of the pipe part. Thus, the counter bore leaves a small edge or lip on the inner diameter of the pipe part. The width $w_s$ of the stop edge 7 can be for instance 0.3-3 mm depending on the length of the pipe part. The width $w_s$ of the stop edge 7 can be for example 2-20% of the length l of the pipe part. The original inner diameter $D_o$ of the pipe part can be for example 10-45 mm. The enlarged diameter $D_e$ of the pipe part can be for example 0.2-2 mm larger than the original inner diameter $D_o$ of the pipe part.

Preferably 3-25% of the original extruded wall thickness is removed to achieve the final internal diameter. As an example it can be mentioned that in one embodiment for an ½ inch ring approximately 0.24 mm of the wall thickness is removed or 7% of the original extruded wall thickness is removed, on average.

The machining tool that enlarges the inner diameter of the pipe part can be formed such that it also simultaneously cuts the chamfer 7 on the inlet inner diameter edge of the pipe part. The machining tool can be for example a reaming drill that has a first end that enlarges the inner diameter of the pipe part and thereafter has a widening part at an angle to the axial direction. The angle to the axial direction is thus the angle of the chamfer and it can be for example between 30-60°. In FIG. 2 the angle of the chamfer 8 is 45°.

Preferably the inner surface of the clamping ring is mainly straight which means that its direction does not differ from the axial direction of the clamping ring. However, if needed the inner surface of the clamping ring can be made slightly conical. In such a case the coning angle of the inner surface of the clamping ring can be in the range of 0.1° to 2°, for example.

The size $s_C$ of the chamfer can be for example 20-80% of the thickness $t_w$ of the wall.

In some cases the features shown in this description can be used as such irrespective of other features. Then again the features shown in this description may, if necessary, be combined in order to conform with different combinations.

It is obvious to a person skilled in the art that in the course of technical progress, the basic idea of the invention may be carried out in numerous ways. Thus, the invention and its embodiments are not limited to the previous examples, but they may vary within the scope of the appended claims.

The invention claimed is:

1. A clamping ring to be used on a pipe when making a pipe connection such that when establishing the pipe connection, an end of a pipe and the surrounding clamping ring expand simultaneously, wherein the clamping ring is made of a plastic material having memory properties such that, after said expansion, the clamping ring shrinks or contracts automatically, the clamping ring further comprising: an inward extending stop edge for positioning the clamping ring on the end of the pipe, the inward extending stop edge disposed at an outlet end of the clamping ring, the inward extending stop edge having a thickness in a direction along a length of the clamping ring in a range of 2%-20% of the length of the clamping ring, and a clamping-ring wall having a thickness in a direction transverse to the length of the clamping ring of 75%-97% of a thickness of the clamping ring in an area of the stop edge in the direction transverse to the length of the clamping ring.

2. The clamping ring according to claim 1, wherein the inner surface of the clamping ring is straight.

3. The clamping ring according to claim 1, wherein the inner surface of the clamping ring is conical.

4. The clamping ring according to claim 1, wherein the inner surface of the clamping ring is conical.

5. The clamping ring of claim 1, wherein the thickness of the stop edge in the direction along the length of the clamping ring is substantially 5% of the length of the clamping ring.

6. The clamping ring of claim 1, wherein the thickness of the clamping ring wall in the direction transverse to the length of the clamping ring is substantially 93% of the thickness of the clamping ring in the area of the stop edge in the direction transverse to the length of the clamping ring.

7. The clamping ring of claim 1, further comprising a chamfer on the inlet inner diameter edge of the clamping ring.

8. The clamping ring according to claim 7, wherein an angle of the chamfer is between 30-60°.

9. The clamping ring according to claim 8, wherein the clamping-ring wall has a thickness, and wherein the size of the chamfer is 20-80% of the thickness of the clamping-ring wall.

10. The clamping ring according to claim 9, wherein the inner surface of the clamping ring is conical.

11. The clamping ring according to claim 8, wherein the inner surface of the clamping ring is conical.

12. The clamping ring according to claim 7, wherein the clamping-ring wall has a thickness, and wherein the size of the chamfer is 20-80% of the thickness of the clamping-ring wall.

13. The clamping ring according to claim 12, wherein the inner surface of the clamping ring is conical.

14. The clamping ring of claim 1, wherein the clamping ring is formed by: extruding a pipe from a plastic material having memory properties, whereby, while extruding the pipe, its inner diameter is formed smaller than the outer diameter of a pipe onto which the clamping ring is positioned before making a pipe connection, cutting the extruded pipe to form a pipe part, and making the inner diameter of the pipe part larger by removing material from the inside of the pipe part but only over part of the length of the pipe part such that the stop edge is formed at one end of the pipe part, whereby the pipe part forms the clamping ring.

* * * * *